(12) United States Patent
Pan et al.

(10) Patent No.: US 8,064,386 B2
(45) Date of Patent: Nov. 22, 2011

(54) WIRELESS COMMUNICATION METHOD AND APPARATUS FOR ENCODING AND DECODING BEAMFORMING VECTORS

(75) Inventors: Kyle Jung-Lin Pan, Smithtown, NY (US); Robert L. Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 690 days.

(21) Appl. No.: 12/174,681

(22) Filed: Jul. 17, 2008

(65) Prior Publication Data

US 2009/0023451 A1 Jan. 22, 2009

Related U.S. Application Data

(60) Provisional application No. 60/950,699, filed on Jul. 19, 2007.

(51) Int. Cl.
*H04W 4/00* (2009.01)
(52) U.S. Cl. ........ 370/328; 455/509; 375/260; 370/335; 370/442
(58) Field of Classification Search .................. None
See application file for complete search history.

(56) References Cited

U.S. PATENT DOCUMENTS

| | | | | |
|---|---|---|---|---|
| 6,778,507 | B1* | 8/2004 | Jalali | 370/317 |
| 7,809,074 | B2* | 10/2010 | Kotecha et al. | 375/267 |
| 2005/0041750 | A1 | 2/2005 | Lau | |
| 2006/0039489 | A1 | 2/2006 | Ikram et al. | |
| 2007/0115909 | A1 | 5/2007 | Wang et al. | |
| 2008/0225960 | A1* | 9/2008 | Kotecha et al. | 375/259 |
| 2008/0310353 | A1* | 12/2008 | Love et al. | 370/329 |
| 2009/0046582 | A1* | 2/2009 | Sarkar et al. | 370/230.1 |
| 2011/0019631 | A1* | 1/2011 | Kotecha et al. | 370/329 |

OTHER PUBLICATIONS

Catt, "Downlink Dedicated Reference Signal Structure for Adaptive Beam-Forming in EUTRA TDD," 3GPP TSG RAN WG1 Meeting #47, R1-063286 (Nov. 6-10, 2006).
Motorola, "Proposal for Dedicated Pilots in Downlink Precoding for EUTRA MIMO," 3GPP TSG RAN WG1 Meeting #48, R1-070770 (Feb. 12-16, 2007).

* cited by examiner

*Primary Examiner* — Bob Phunkulh
(74) *Attorney, Agent, or Firm* — Condo Roccia LLP

(57) ABSTRACT

A wireless communication method and apparatus for encoding and decoding beamforming vectors are disclosed. A base station sends explicit signaling for a beamforming vector of a wireless transmit/receive unit (WTRU) and implicit signaling for beamforming vectors of interfering WTRUs. Each WTRU uses its own beam forming vector to estimate the beamforming vectors of each of the other WTRUs.

19 Claims, 4 Drawing Sheets

WIRELESS COMMUNICATION METHOD AND APPARATUS FOR ENCODING AND DECODING BEAMFORMING VECTORS

CROSS REFERENCE TO RELATED APPLICATIONS

This application claims the benefit of U.S. Provisional Application No. 60/950,699 filed Jul. 19, 2007, which is incorporated by reference as if fully set forth.

This application is also related to co-pending U.S. patent application Ser. No. 10/052,842, which is incorporated herein by reference.

FIELD OF INVENTION

This application is related to wireless communications.

BACKGROUND

Many wireless communications systems contain a base station in two-way wireless communication with a plurality of wireless transmit/receive units (WTRUs). The base station may send signals containing beamforming vectors to each WTRU. The signal instructs the WTRU as to how to receive a radio beam formed by a base station having a specific beam shape for communicating between the WTRU and the base station. A goal of such beam forming is to optimize the overall performance of the system. One example of such optimization is the supporting of multi-user multiple-input multiple-output (MU-MIMO) communications and minimizing of interference when two or more WTRUs are transmitting simultaneously using the same frequency/time resources.

Co-pending U.S. patent application Ser. No. 10/052,842, which is incorporated herein by reference, discloses that beamforming or precoding information needs to be communicated from a transmitter, (e.g., a base station), to a receiver, (e.g., a wireless transmit/receive unit (WTRU)), to avoid a channel mismatch between transmitting and receiving signals. This is particularly important for multiple-input multiple-output (MIMO) data demodulation when beamforming and precoding are used. When a receiver uses incorrect beamforming information for constructing effective channel responses for data detection, significant performance degradation can occur.

Generally, beamforming or precoding information may be communicated using explicit control signaling, particularly when the transmitter and receiver are restricted to the use of limited sets of antenna weight coefficients for beamforming and precoding. The limited sets of antenna weight coefficients are sometimes referred to as a beamforming or precoding codebook. Explicit signaling to communicate beamforming or precoding information from a transmitter to a receiver may incur large signaling overhead, particularly for MU-MIMO systems in which the desired beamforming information needs to be communicated to the WTRU. Furthermore, interference beamforming information may have to be communicated to the WTRU to enable advanced receiver processing, such as joint detection and interference cancellation. The signaling overhead increases when a large size codebook is deployed.

FIG. 1 shows a wireless communication system 100 including a base station 105 and a WTRU 110. The base station 105 may include a MIMO antenna 115 having a plurality of transmit antennas 116A, 115B, 115C and 115D. The WTRU 110 may also include a MIMO antenna 120 having a plurality of receive antennas 120A, 120B, 120C and 120D.

The base station 105 communicates with the WTRU 110 by transmitting signals via resource blocks (RBs) 125 to the WTRU 110. Each of the RBs 125 has a particular RB structure that includes a plurality of resource elements (REs). In accordance with the particular RB structure, each RE may be reserved for one of the following:

1) a common reference signal (CRS) associated with one of the transmit antennas 116A, 115B, 115C and 115D of the base station 105;
2) a dedicated reference signal (DRS) including a single beamformed or precoded pilot;
3) a DRS including a composite beamformed or precoded pilot; and
4) a data symbol.

At least a portion of data symbols reserved by REs of the RBs 125 are "control type" data symbols that include a DRS mode indicator. Once decoded, the DRS mode indicator enables the WTRU 110 to properly detect/demodulate data symbols in the RBs 125 transmitted by the base station 105.

A hybrid DRS scheme in which REs are reserved for DRSs including a single beamformed or precoded pilot and/or a composite beamformed or precoded pilot is introduced, where a plurality (N) of DRSs per RB are used.

As introduced by co-pending U.S. patent application Ser. No. 10/052,842, FIG. 2 shows an example of an RB structure that may be used to transmit signals by the base station 105 and receive signals by the WTRU. Each of a plurality of RBs 205 and 210 includes a plurality of REs reserved for data symbols (D), a plurality of REs reserved for CRSs associated with respective base station transmit antennas ($T_1$-$T_4$), and a plurality of REs reserved for DRSs (P), which include either a single beamformed or precoded pilot, or a composite beamformed or precoded pilot. As shown in FIG. 2, the DRSs are reserved by REs 215, 220, 225, 230, 235, 240, 245, 250, 255, 260, 265 and 270.

Signaling of the beamforming vector of interfering WTRUs to a specific desired WTRU allows the specific WTRU to perform advanced receiver processing, (e.g. joint detection and cancellation of interference). At the same time, signaling the beamforming vector of the specific desired WTRU may require better accuracy than signaling the beamforming vectors of interfering WTRUs. Usually, the information transmitted using explicit signaling, such as by using a physical downlink control channel (PDCCH), is more accurately detected and decoded by the WTRU in terms of error probability or rate of detection than the information transmitted using implicit signaling, such as by using a DRS. This is because explicit signaling (e.g., signaling via PDCCH) is protected by channel coding and cyclic redundancy check (CRC). On the other hand, implicit signaling (e.g., signaling via DRS) does not have channel coding and CRC protection, and requires blind detection to withdraw the information carried by the DRS. However, the overhead using explicit signaling or PDCCH to carry all beamforming information including both desired and interference information is large, as compared with the overhead using implicit signaling or DRS. A more efficient signaling scheme and method is desirable to minimize the signaling overhead while maintaining the performance and at the same time have more protection on the most important beamforming information.

SUMMARY

A wireless communication method and apparatus are used to encode and decode beamforming information including beamforming vectors in which explicit and implicit signaling are used together to transmit beamforming information. Signals carrying beamforming information are multiplexed and demultiplexed for downlink MU-MIMO communication. A signaling scheme that combines explicit and implicit signaling schemes to transmit beamforming information for MU-MIMO systems is proposed. Part of beamforming information may be explicitly signaled and part or all of beamforming information may be implicitly signaled.

A type of beamforming information may be explicitly signaled, and another (or all types) of beamforming information may be implicitly signaled. One example of explicit signaling is the signaling via a PDCCH. One example of implicit signaling is the signaling via a DRS. One type of beamforming information is "own" (desired) beamforming information for a given user. Another type of beamforming information is interfering beamforming information, i.e., the beamforming information of interfering users. Explicit signaling has the advantages of high accuracy but has a disadvantage of high overhead. Implicit signaling has the advantage of low overhead but has disadvantages of low accuracy. By combining explicit and implicit signaling for transmitting beamforming information, the performance, accuracy and overhead can be traded off and optimized, and the beamforming information is protected differently according to the importance of different types of beamforming information. Thus, explicit signaling is used for conveying "own" beamforming information, (the beamforming information or vector of a desired WTRU), and implicit signaling is used for conveying the interfering beamforming information, (the beamforming information or vectors of interfering WTRUs).

BRIEF DESCRIPTION OF THE DRAWINGS

A more detailed understanding may be had from the following description, given by way of example in conjunction with the accompanying drawings wherein.

DETAILED DESCRIPTION

Figure 1:
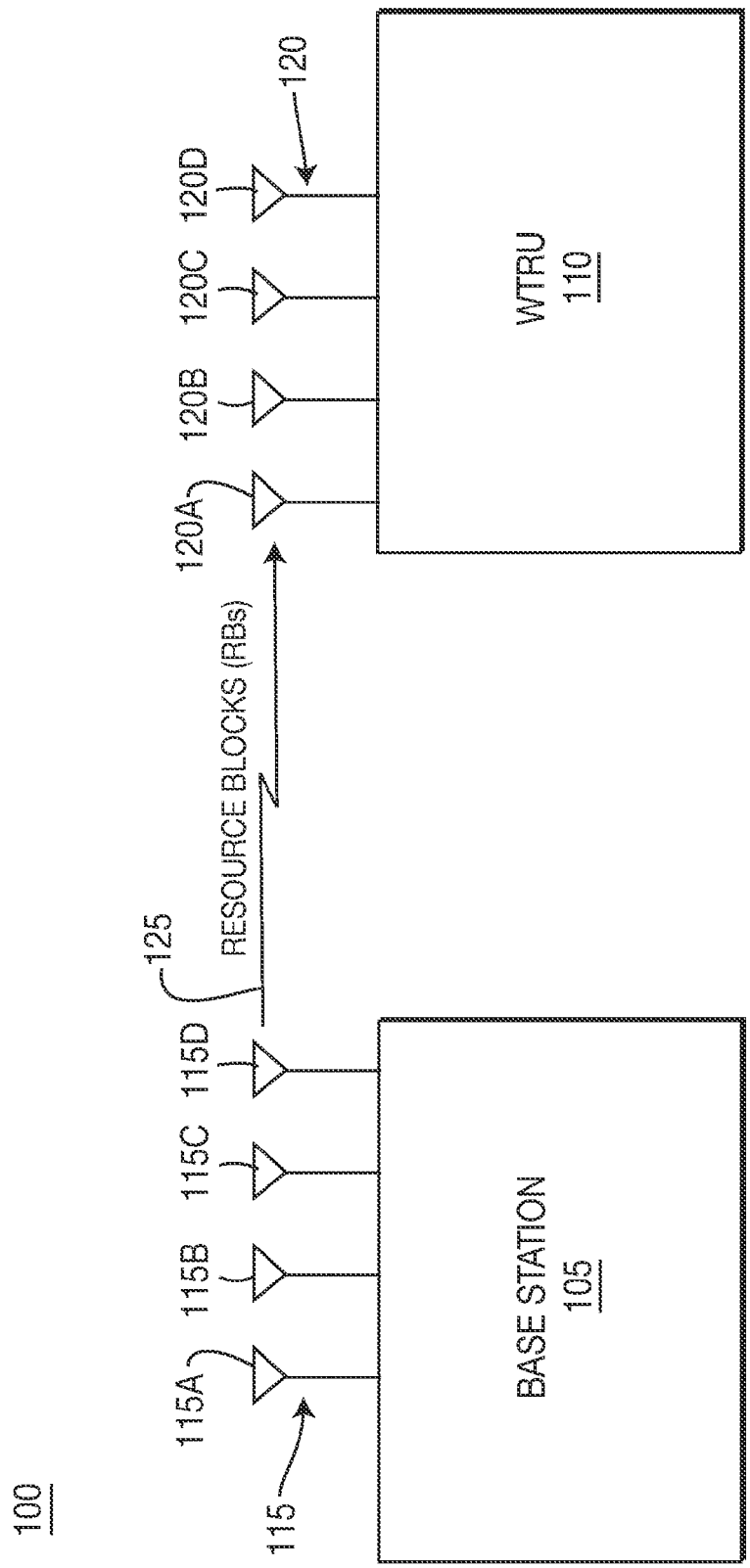
FIG. 1 shows a conventional wireless communication system including a base station and a WTRU.
Figure 2:
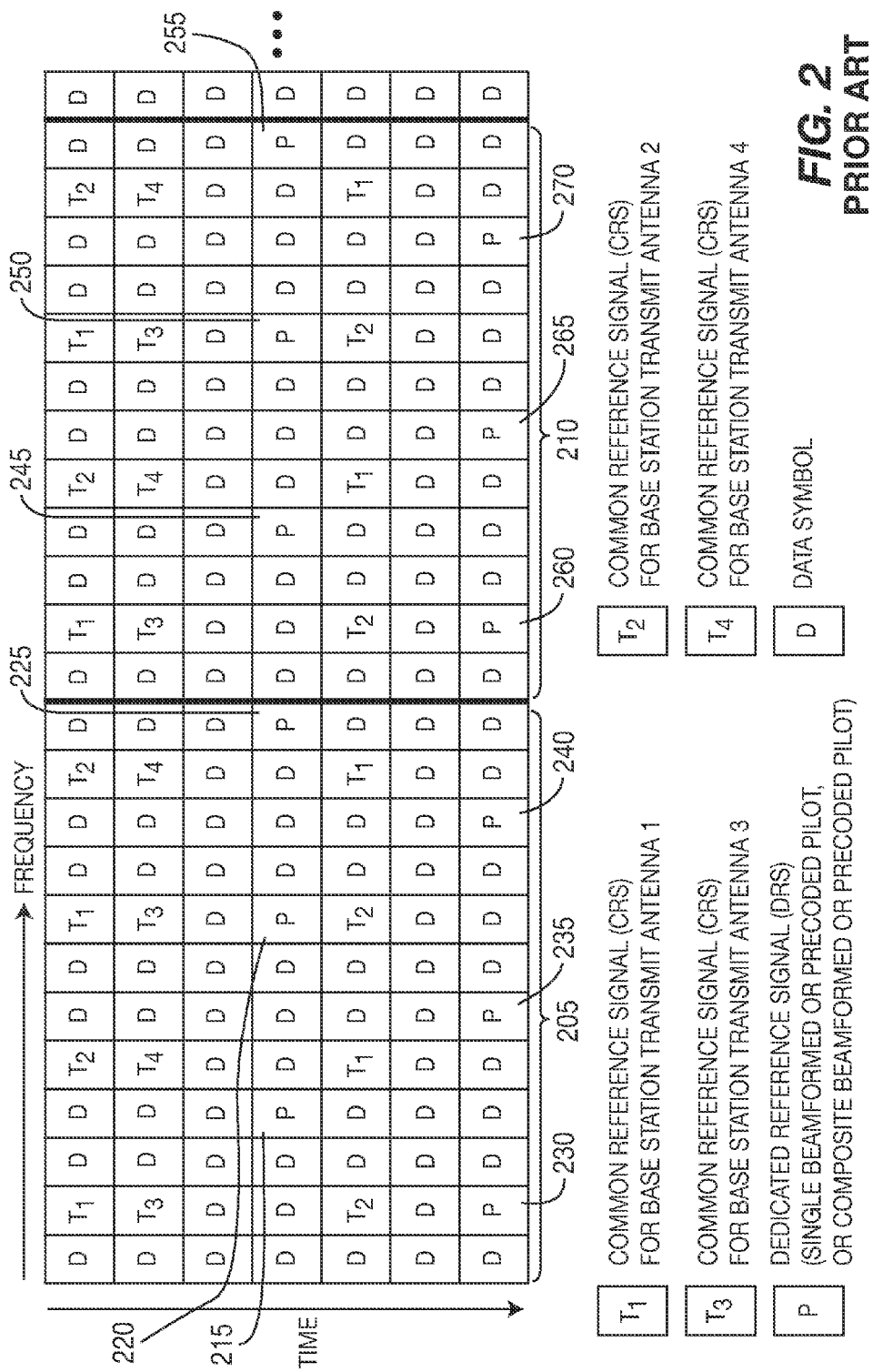
FIG. 2 shows an example of conventional RB structures transmitted by the base station in the system of FIG. 1.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

Beamforming information is categorized into at least two types—"own" beamforming information, ("type A" beamforming information), and interference beamforming information, ("type B" beamforming information). Type A beamforming information is required for a WTRU to correctly perform the data detection. "Type B" beamforming information is used for a WTRU to enhance the data detection in order to improve the performance of data detection by canceling the interference with the help of "type B" beamforming information. Thus, "type A" beamforming information may be considered to be more important than "type B" beamforming information. In the proposed scheme, a greater amount of protection is used for "type A" beamforming information than is used for "type B" beamforming information.

Signaling schemes are categorized into two methods—explicit signaling and explicit signaling. Explicit signaling uses channel coding and CRC to protect transmitted information. Implicit signaling does not use channel coding and CRC to protect information transmitted, but instead uses reference signals to carry information. Because there is no channel coding and CRC protection for implicit signaling, the information that is received and detected by a WTRU is considered to be less accurate, and has more error probability and/or a higher error rate as compared to the explicit signaling method. On the other hand, because there is channel coding and CRC to protect beamforming information for explicit signaling, the signaling overhead for explicit signaling is considered much higher than the signaling overhead for implicit signaling method. Beamforming information is protected more when it is transmitted using explicit signaling method than using implicit signaling method.

In the proposed signaling scheme for beamforming information, both "type A" and "type B" beamforming information are communicated to the WTRU. The "type A" beamforming information, (i.e., the beamforming matrix or vector of a desired WTRU), is conveyed using explicit signaling method, and "type B" beamforming information, (the beamforming matrices or vectors of interfering WTRUs), is conveyed using implicit signaling method.

One example of an explicit signaling uses a control channel, such as a PDCCH. One example of an implicit signaling method uses reference signals, such as a DRS. Beamforming information contains a beamforming (or precoding) matrix or vector(s).

In order to trade off between performance, accuracy and overhead, it would be desirable to explicitly signal one type of beamforming information, and implicitly signal the other type of beamforming information. It would be also desirable to explicitly signal one type of beamforming information, and implicitly signal all types of beamforming information in order to perform efficient blind detection of beamforming information.

In order to trade off between performance, accuracy and overhead, it would be desirable to explicitly signal "type A" beamforming information, and implicitly signal both "type A" and "type B" beamforming information.

In order to trade off between performance, accuracy and overhead, it would be desirable to explicitly signal part of beamforming information, and implicitly signal the other part of beamforming information. It would be also desirable to explicitly signal part of beamforming information, and implicitly signal all the beamforming information in order to perform efficient blind detection of beamforming information.

A "type A" beamforming matrix or vector is "own" beamforming information, i.e., the beamforming information dedicated to the particular WTRU. A "type B" beamforming matrix or vector is the beamforming information dedicated to other WTRU that is considered to be an interfering WTRU to the particular WTRU.

As one implementation, the "own" (desired) beamforming information or "type A" beamforming matrix or vector may be transmitted using explicit signaling, e.g., by a PDCCH, and interference beamforming information or "type B" beamforming information, (or both own and interference information, i.e., both "type A" and "type B" beamforming matrix or vector), may be transmitted using implicit signaling, e.g., by a DRS. Thus, the performance, detection, accuracy and signaling overhead can be balanced and optimized.

A signaling scheme that combines explicit and implicit signaling schemes to transmit beamforming information is used for MU-MIMO systems. A "type A" beamforming matrix or vector may be explicitly signaled and both "type A" and "type B" beamforming information may be implicitly signaled. Part of beamforming information may be explicitly signaled and part or all of beamforming information may be implicitly signaled.

Beamforming information that is signaled explicitly and beamforming information that is signaled implicitly may overlap in order to enable efficient blind detection. It is possible that beamforming information that is signaled explicitly may be a subset of beamforming information that is signaled implicitly, or vice versa. One example of explicit signaling is the signaling via a PDCCH. One example of implicit signaling is the signaling via a DRS. Explicit signaling may contain desired beamforming information. Implicit signaling may contain both desired and interference beamforming information, which is an example that information that is signaled explicitly may be a subset of information that is signaled implicitly for beamforming or precoding.

Explicit signaling for beamforming information has advantages of high performance and high accuracy but has disadvantages of high signaling overhead. Implicit signaling for beamforming information has advantages of low signaling overhead but has disadvantages of low performance and low accuracy. By combining explicit and implicit signaling for transmitting beamforming information, the performance, accuracy and signaling overhead can be traded off and optimized.

To emphasize the importance of beamforming information, beamforming information of high importance is transmitted using explicit signaling and beamforming information of less importance is transmitted using implicit signaling.

"Type A" and "type B" beamforming information are transmitted to a WTRU. As one implementation, "type A" beamforming information is transmitted via a WTRU-specific PDCCH, and both "type A" and "type B" beamforming information are transmitted via a DRS.

Usually beamforming information or vector(s) of the desired WTRU is more important than the beamforming information or vectors of interfering WTRUs. To protect beamforming information or vector(s) of the desired WTRU, explicit signaling is used for transmitting or carrying beamforming information or vector(s) of the desired WTRU, and implicit signaling is used for transmitting or carrying beamforming information or vectors of interfering WTRUs.

Figure 3:
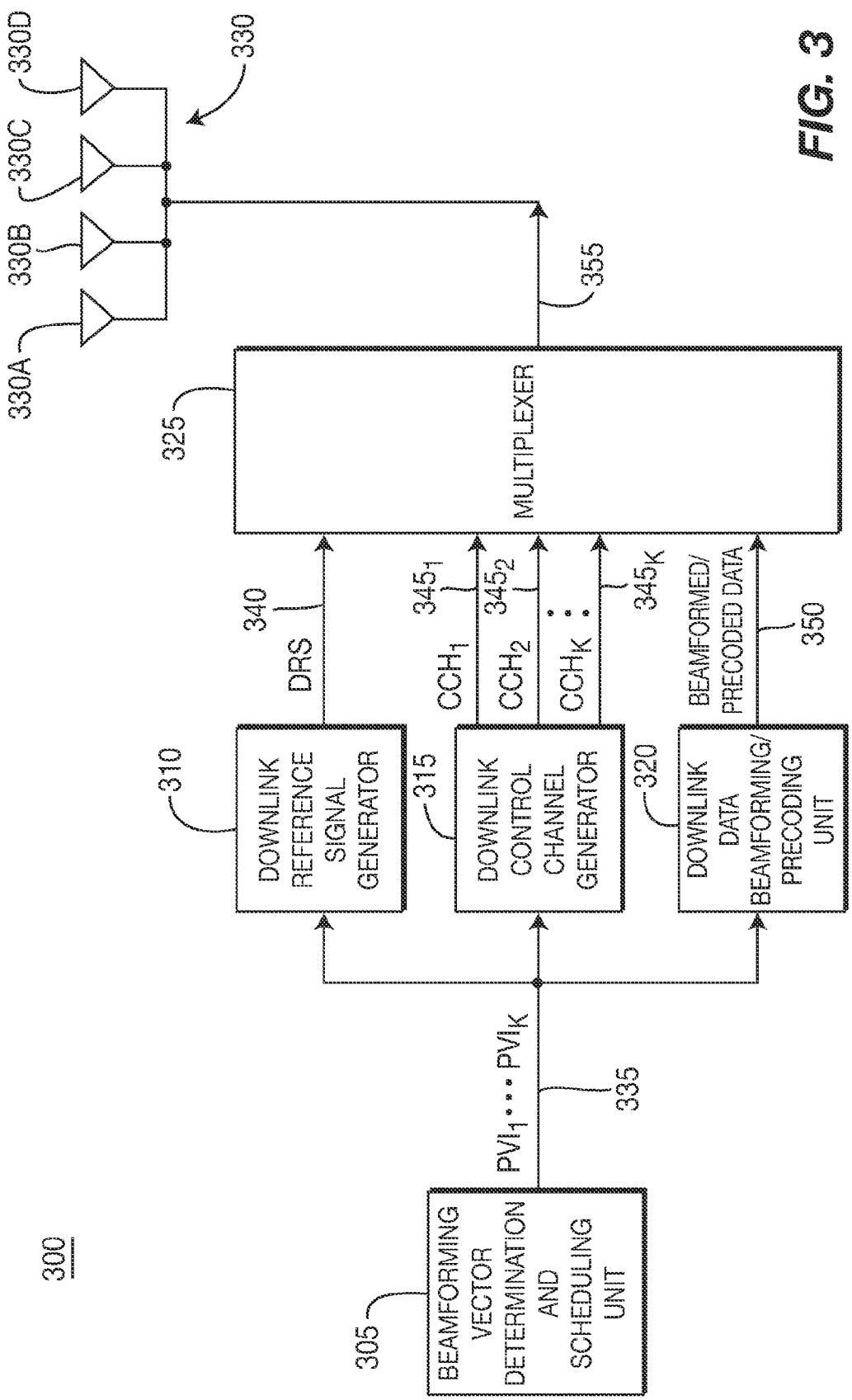
FIG. 3 is a block diagram of a base station that uses a signaling scheme that combines explicit signaling and implicit signaling.

FIG. 3 is a block diagram of a base station 300 that multiplexes explicit and implicit signaling to communicate with a plurality of WTRUs; $WTRU_1$, $WTRU_2$, ..., $WTRU_K$ (not shown). The base station 300 comprises a beamforming vector determination and scheduling unit 305, a downlink reference signal generator 310, a downlink control channel generator 315, a downlink data beamforming/precoding unit 320, a multiplexer 325, and a MIMO antenna 330 having a plurality of antenna elements 330A, 330B, 330C and 330D.

Referring to FIG. 3, the beamforming vector determination and scheduling unit 305 outputs a beamforming/precoding information signal 335 for WTRUs including precoding vector indices ($PVI_1$, $PVI_2$, ..., $PVI_K$) to the downlink reference signal generator 310, the downlink control channel generator 315 and the downlink data beamforming/precoding unit 320. For example, $PVI_1$ is beamforming information for $WTRU_1$.

Thus, $PVI_2$, ..., $PVI_K$ are the beamforming information for $WTRU_2$, ..., $WTRU_K$, respectively. For a desired WTRU, one of the PVIs; $PVI_1$, $PVI_2$, ..., $PVI_K$ is the own (desired) beamforming/precoding information and the rest of the PVIs are the interfering beamforming/precoding information for the desired WTRU. For example, for $WTRU_1$, $PVI_1$ constitutes the $WTRU_1$'s own beamforming information, (i.e., C_own), and $PVI_2$, ..., $PVI_K$ are the interference beamforming information for $WTRU_1$. Alternatively, besides using PVIs, any other type of beamforming or precoding information indices, such as precoding matrix indices (PMIs), may be used. It should be understood by one of skill in the art that beamforming information, matrix or vector may be interchangeable for precoding information, matrix or vector.

The downlink reference signal generator 310 generates DRS signals 340, (i.e., implicit signaling), that carry own (desired) and/or interference beamforming information embedded with the precoding vector indices ($PVI_1$, $PVI_2$, ..., $PVI_K$) which correspond to WTRUs $WTRU_1$, $WTRU_2$, ..., $WTRU_K$. The downlink control channel generator 315 generates WTRU-specific control channels (CCHs) $345_1$, $345_2$, ..., $345_K$, (i.e., explicit signaling), which may be WTRU-specific PDCCHs that carry the precoding vector indices ($PVI_1$, $PVI_2$, ..., $PVI_K$). The downlink data beamforming/precoding unit 320 generates beamformed/precoded data 350 using beamforming or precoding vectors corresponding to $PVI_1$, $PVI_2$, ..., $PVI_K$.

The DRS signals 340, control signals, (e.g., PDCCH), $345_1$, $345_2$, ..., $345_K$, associated with a plurality (K) of WTRUs, and beamformed/precoded data signals 350 are multiplexed together by the multiplexer 325 into proper resource elements or resource blocks in frequency and/or time domain. The DRS signals 340 carry all beamforming information including the own (desired) and interference beamforming information for all WTRUs. The signals 345 carry beamforming information for the WTRUs $WTRU_1$, $WTRU_2$ ... $WTRU_K$. Data 350 is beamformed/precoded for $WTRU_1$ ... $WTRU_K$ using respective precoding vector indices $PVI_1$ ... $PVI_K$.

The multiplexed signals 355 are then sent to the antenna 330 for transmission to the plurality of WTRUs via the antenna elements 330A, 330B, 330C and 330D.

Figure 4:
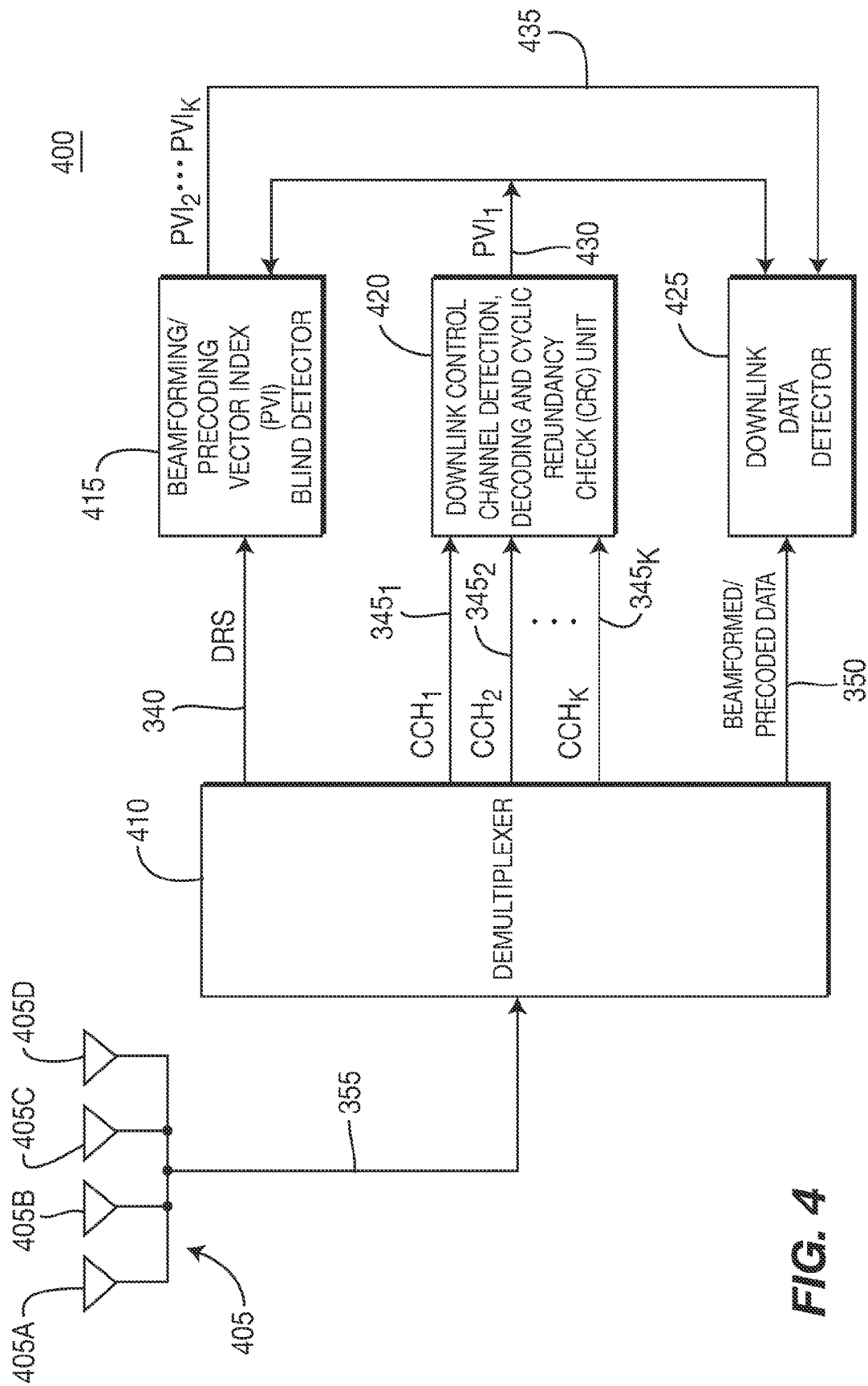
FIG. 4 is a block diagram of a WTRU that processes signals generated by the base station of FIG. 3 using a signaling scheme that combines explicit signaling and implicit signaling.

FIG. 4 is a block diagram of a WTRU 400 that receives and processes the multiplexed signals 355 transmitted by the base station 300 of FIG. 3. The WTRU 400 includes a MIMO antenna 405 having a plurality of antenna elements 405A, 405B, 405C and 405D, a demultiplexer 410, a beamforming/precoding vector index (PVI) blind detector 415, a downlink control channel detection, decoding and CRC unit 420, and a downlink data detector 425.

Referring to FIG. 4, the multiplexed signals 355 are received at antenna 405. The received multiplexed signals 355 are demultiplexed by the demultiplexer 410 into proper resource elements or resource blocks in frequency and time domain. DRS signals 340 are then forwarded to the PVI blind detector 415 for blind detection of precoding or beamforming vectors. Control channel signals, (e.g., PDCCH), $345_1$, $345_2$, ..., $345_K$, are forwarded to the downlink control channel detection, decoding and CRC unit 420 in which the PDCCHs are detected, decoded and CRC checked. For any WTRU, only one PDCCH will be successfully detected, decoded and pass CRC check. That successful PDCCH is considered to be the PDCCH dedicated to the particular WTRU. Beamformed/precoded data signals 350 are forwarded to the downlink data detector 425. The beamforming/precoded vectors, obtained by the PVI blind detector 415 and the downlink control channel detection, decoding and CRC unit 420, are fed to the downlink data detector 425 for data detection. For example, for $WTRU_1$, the downlink control channel detection, decoding and CRC unit 420 outputs a signal 430 including $PVI_1$, which is input to the beamforming/PVI blind detector 415. The beamforming/PVI blind detector 415 then subtracts a signal, constructed using beamforming or precoding information corresponding to an index ($PVI_1$) associated with the desired WTRU, from the DRS 340 to estimate beamforming vectors associated with the other WTRUs, and outputs a signal 435 including only $PVI_2 \ldots PVI_K$, without $PVI_1$. The beamforming/precoding information 430 and 435 are used by the downlink data detector 425 to compute effective channel responses. Effective channel responses are the channel responses that have precoding or beamforming effects which are used for proper data detection.

The WTRU 400 first detects and decodes its own control channel (e.g., PDCCH) for explicit signaling to obtain the RB information, modulation information, and the like, and its own beamforming vector, C_own. C_own is one of a plurality of precoding vector indices $PVI_1 \ldots PVI_K$ associated with a particular WTRU. For example, for $WTRU_1$, C_own is $PVI_1$.

The WTRU 400 removes the known component, (i.e., C_own), from received signal Y that is contributed by the WTRU's own beamforming vector, C_own. Finally, the WTRU 400 performs blind detection to obtain the beamforming vectors of interfering WTRUs. The blind detection procedure removes the desired beamforming vector C_own before blind detection of interfering beamforming vectors of other WTRUs.

The beamforming vector(s) of a desired WTRU is signaled via a shared control channel, (e.g., via a PDCCH), while beamforming vectors of all WTRUs, (including interfering WTRUs), are signaled via composite beamformed/precoded pilots, (e.g., via a DRS).

The base station 300 may transmit to a plurality (K) of WTRUs using the scheme of combined shared control channel and composite beamformed/precoded reference channel. A beamforming vector of each WTRU is sent using a WTRU-specific shared control channel. A pilot is precoded by beamforming vectors of all K WTRUs. The resulting precoded signals (K signals) are summed up and produce a summed signal S, which is a transmitted signal at the base station, which is given by the equation:

$$S = \sum_{k=1}^{K} C_k P; \quad \text{Equation (1)}$$

where $C_k$ is a beamforming vector for the Kth WTRU and P represents the pilot. The summed signal S is then sent via the composite beamformed/precoded reference channel. The composite beamformed/precoded reference channel could be the DRS channel.

The received signal at each WTRU may be modeled by the equation:

$$Y = H \sum_{k=1}^{K} C_k P + N; \quad \text{Equation (2)}$$

where Y is the received signal at a DRS, H is a matrix representing the channel, and N represents noise. Subtracting the desired signal from Y gives the following equation:

$$\tilde{Y} = Y - \hat{H} C_{own} P; \quad \text{Equation (3)}$$

where $\hat{H}$ is an estimate of H, and $C_{own}$ is the beamforming vector of a specific WTRU. Performing blind detection on the new Y or $\tilde{Y}$, a set of estimated beamforming vectors is obtained based on the following formula:

$$\{\hat{C}\} = \arg \min_{\substack{\{C_k\} \in C \\ C_k \neq C_{own}}} \left\| \tilde{Y} - \hat{H} \sum_{k=1}^{K-1} C_k P \right\|^2; \quad \text{Equation (4)}$$

where $\{C\}$ is a set of transmitted beamforming vectors and $\{\hat{C}\}$ is the set of estimates of beamforming vectors. Arg is the argument for a set of beamforming vectors which are complex vectors. Beamforming vectors C are searched among a codebook and those combinations of C that result in the smallest norm or distance in formula are selected. Blind detection thus produces a set of estimated beamforming vectors for interfering WTRUs: $\{\hat{C}\} = \{\hat{C}_1, \hat{C}_2, \ldots, \hat{C}_{K-1}\}$.

Alternatively, the beamforming vector(s) of a desired WTRU is signaled via a shared control channel, (e.g., via a PDCCH), while beamforming vectors of interfering WTRUs are signaled via a composite beamformed/precoded pilots (e.g., via DRS).

Beamforming information contains a beamforming (or precoding) matrix or vector(s). This is assumed in the above discussions for illustration purpose. It should be noted that the proposed method applies to general beamforming information that may also contain other information regarding the number of users, number of transmission layers, number of spatial streams, or the information regarding the rank for MIMO. Furthermore, beamforming information may also contain other information or parameters related to MIMO, beamforming and/or precoding to perform beamforming and/or precoding accordingly.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of signaling beamforming or precoding information, the method comprising:
   generating a reference signal including a plurality of indices associated with beamforming or precoding information, wherein one of the indices is associated with a particular wireless transmit/receive unit (WTRU), and the remaining indices are associated with WTRUs that interfere with the particular WTRU;
   generating a plurality of control channels, each control channel being associated with a respective one of the indices included in the reference signal;
   multiplexing the reference signal and the control channels to generate a multiplexed signal; and
   transmitting the multiplexed signal, wherein the particular WTRU is configured to receive the multiplexed signal and to subtract the index associated with the particular WTRU from the indices in the reference signal to estimate beamforming vectors associated with the interfering WTRUs.

2. The method of claim 1 wherein the particular WTRU is configured to receive the multiplexed signal and to perform a cyclic redundancy check (CRC) on each control channel to determine the index associated with the particular WTRU.

3. The method of claim 1 wherein the reference signal is a dedicated reference signal (DRS).

4. The method of claim 1 wherein each of the control channels is a physical downlink control channel (PDCCH).

5. The method of claim 1 wherein the indices are precoding matrix indices (PMIs).

6. The method of claim 1 wherein the indices are precoding vector indices (PVIs).

7. The method of claim 1 further comprising:
   generating beamformed or precoded data; and
   multiplexing the reference signal, the control channels and the data to generate the multiplexed signal.

8. A base station comprising:
   a downlink reference signal generator configured to generate a reference signal including a plurality of indices associated with beamforming or precoding information, wherein one of the indices is associated with a particular wireless transmit/receive unit WTRU, and the remaining indices are associated with WTRUs that interfere with the particular WTRU;
   a downlink control channel generator configured to generate a plurality of control channels, each control channel being associated with a respective one of the indices included in the reference signal;
   a multiplexer configured to multiplex the reference signal and the control channels to generate a multiplexed signal; and
   at least one antenna configured to transmit the multiplexed signal, wherein the particular WTRU is ca able of receiving the transmitted multiplexed signal and subtraction the index associated with the particular WTRU from the indices in the reference signal to estimate beamforming vectors associated with the interfering WTRUs.

9. The base station of claim 8 wherein the reference signal is a dedicated reference signal (DRS).

10. The base station of claim 8 wherein each of the control channels is a physical downlink control channel (PDCCH).

11. The base station of claim 8 wherein the indices are precoding matrix indices (PVIs).

12. The base station of claim 8 wherein the indices are precoding vector indices (PVIs).

13. A desired wireless transmit/receive unit (WTRU) comprising:
   at least one antenna configured to receive a multiplexed signal;
   a demultiplexer configured to demultiplex the signal into a reference signal and a plurality of control signals, the reference signal including a plurality of indices associated with beamforming or precoding information, wherein one of the indices is associated with the desired WTRU, and the remaining indices are associated with other WTRUs that interfere with the desired WTRU, and each control channel being associated with a respective one of the indices included in the reference signal;
   a downlink control channel detection, decoding and cyclic redundancy check (CRC) unit configured to receive the control channels from the demultiplexer and output the index associated with the desired WTRU; and
   a blind detector configured to subtract a signal constructed using beamforming or precoding information corresponding to the index associated with the desired WTRU from the reference signal to estimate beamforming vectors associated with the other WTRUs.

14. The desired WTRU of claim 13 wherein the reference signal is a dedicated reference signal (DRS).

15. The desired. WTRU of claim 13 wherein each of the control channels is a physical downlink control channel (PDCCH).

16. The desired WTRU of claim 13 wherein the indices are precoding matrix indices (PMIs).

17. The desired WTRU of claim 13 wherein the indices are precoding vector indices (PYIs).

18. The desired WTRU of claim 13 wherein the demultiplexer is configured to demultiplex the signal into a reference signal, a plurality of control signals and beamformed or precoded data.

19. The desired WTRU of claim 18 further comprising:
   a downlink data detector which is configured to receive the beamformed or precoded data, the index associated with the desired WTRU, and the estimated beamforming vectors associated with the other WTRUs.

* * * * *